United States Patent Office 3,636,220

Patented Jan. 18, 1972

3,636,220

1 - (SUBSTITUTED)-PHENYL - 5 - AMINOTETRAZOLES FOR THE TREATMENT OF INFLAMMATION AND COMPOSITIONS THEREFOR

Takashi Enkoji, Park Forest, and Charles D. Bossinger, Olympia Fields, Ill., assignors to Armour Pharmaceutical Company, Chicago, Ill.

No Drawing. Continuation of application Ser. No. 585,251, Oct. 10, 1966. This application July 24, 1969, Ser. No. 844,640

Int. Cl. A61k 27/00

U.S. Cl. 424—269 7 Claims

ABSTRACT OF THE DISCLOSURE

Therapeutic treatment of the animal organism with 1-(substituted)-phenyl-5-aminotetrazoles, particularly treatment methods and compositions containing 1-(substituted)-phenyl-5-aminotetrazoles employed to provide relief from inflammatory conditions and muscle tension.

DESCRIPTION OF THE INVENTION

This application is in part a continuation of our co-pending application Ser. No. 585,251 filed Oct. 10, 1966 for "1-(Substituted)-5-aminotetrazoles and Treatment of the Animal Organism Therewith."

This invention relates to the treatment of the animal organism to relieve inflammatory conditions and muscle tension by methods and compositions containing 1-(substituted)-phenyl-5-aminotetrazoles.

Inflammatory conditions, exhibiting one or more of the symptoms of redness, pain, heat and swelling, have in the past been treated with various analgesics, antipyretics, narcotics, hormones, and steroids, alone or in combination. Referring to the rheumatoid diseases, particularly rheumatoid arthritis, as illustrative, it is generally accepted that the most desirable result is achieved by the administration of the glucocorticoid steroids, when the subject can assimilate and tolerate the drug. However, extreme care must be exercised in administering the steroids, to avoid or minimize the various undesirable side effects which are encountered. The steroids must be employed with extreme caution, if at all, in the presence of various other diseases and conditions of the subject. Also, the subject frequently is resistant to steroid therapy. Accordingly, the need continues for anti-inflammatory agents, compositions, and treatment methods which do not involve the use of steroids.

Another area of treatment that is of substantial interest involves the central nervous system. It is especially desirable that new compounds, compositions, and treatment methods be provided for producing muscle-relaxation, more particularly, long-lasting relaxation of the skeletal muscles.

We have now discovered in accordance with the invention that 1-substituted-phenyl-5-aminotetrazoles, and particularly that certain 1-(substituted)-phenyl-5-aminotetrazoles such as 1-halophenyl-5-aminotetrazoles, 1-alkylphenyl-5-aminotetrazoles, and 1 - alkoxyphenyl-5-aminotetrazoles possess advantageous pharmacological properties. In particular, these compounds possess anti-inflammatory and central nervous system depressant, especially muscle relaxant activities.

This invention also provides new pharmaceutical compositions employing said 1-substituted-phenyl-5-aminotetrazoles or a pharmaceutically acceptable salt thereof as an active agent and new methods of treating the animal organism therewith, especially to alleviate inflammatory conditions and to produce muscle relaxation.

This invention also provides novel 1-substituted-phenyl-5 - aminotetrazoles wherein the substituting moiety is mono-bromophenyl, monofluorophenyl, monochlorophenyl, monomethylphenyl, monomethoxyphenyl, monoisopropylphenyl, monohydroxyphenyl.

The 1-monochlorophenyl-5-aminotetrazoles were known prior to the present invention (Henry et al., J. Am. Chem. Soc., 76, 88–93, 1954). However, so far as we are aware, these compounds were not known to possess the anti-inflammatory and central nervous system depressant activities and utility in the treatment of the animal organism discovered by us. The 1-monobromophenyl-, and 1-monofluorophenyl provided by the invention are new compounds, so far as we are aware, having anti-inflammatory and central nervous system depressant activities.

To aid in the understanding of the invention, we shall now describe the preparation of 1-substituted-phenyl-5-aminotetrazoles for illustrative purposes.

The 1-substituted-phenyl-5-aminotetrazoles can be prepared by reacting a phenyl or phenylalkylthiourea with an alkyl halide to produce a phenyl or phenylalkyl-S-alkylisothiourea hydrohalide, the reaction being represented as follows:

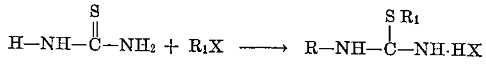

wherein R is substituted phenyl or substituted phenylalkyl, $R_1$ is methyl or ethyl, and X is chloro or bromo. The product is reacted with hydrazine to produce 1-(substituted)-phenyl- or 1-(substituted)-phenylalkyl-5-aminoguanidine hydrohalide:

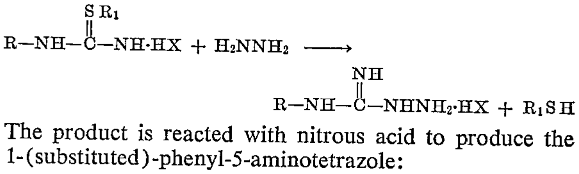

The product is reacted with nitrous acid to produce the 1-(substituted)-phenyl-5-aminotetrazole:

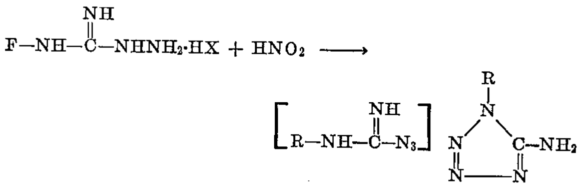

In the preferred embodiments of the invention, R is monochlorophenyl, monobromophenyl, monofluorophenyl, monomethylphenyl or monomethoxyphenyl.

The 1-(substituted)-phenyl-5-aminotetrazoles may also be prepared by reacting an appropriately substituted benzonitrile with hydrazoic acid prepared in situ in a non-reacting organic solvent such as chloroform, where R represents

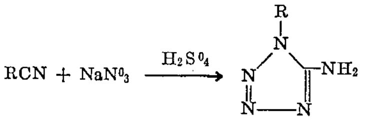

An appropriately substituted phenyl group such as m-fluorophenyl, m-methylphenyl and p-methylphenyl.

The 1-substituted-phenyl-5-aminotetrazoles may also be prepared by reacting an appropriately substituted phenethylamine with S - ethylisothiosemicarbazide, hydrobromide to yield 1-substituted-phenyl-5-aminoguanidine hydrobromide, the reaction being represented as follows:

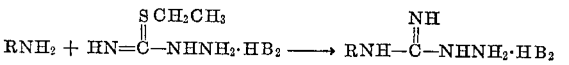

wherein R is substituted phenethyl. The product is reacted with nitrous acid to produce the 1-substituted-phenyl-5-aminotetrazole:

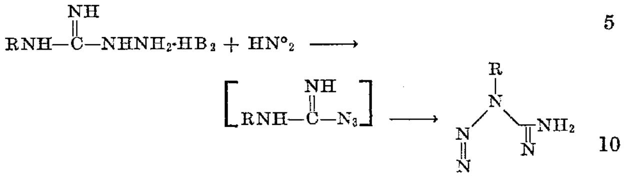

wherein R is a substituted phenethyl.

The 1-substituted-phenyl-5-aminotetrazoles may be employed as the free bases or in the form of their non-toxic pharmaceutically acceptable salts. Thus, for example, organic and inorganic acid addition salts may be employed, such the the salts of sulfuric, nitric, phosphoric, citric, acetic, lactic, tartaric, sulfamic, succinic, fumaric, maleic, ethanedisulfonic, hydrobromic, benzoic and similar non-toxic acids. The salts may be prepared by reacting the tetrazole bases with excess acid in a suitable solvent, such as ethanol, acetone, water, or mixtures thereof. The mixture is heated to effect solution, and the salts crystallize on cooling.

The 1-substituted-phenyl-5-aminotetrazoles and their salts are administered in therapeutically effective amounts to animals, including man, and in appropriate ways. Thus, daily dosages of about 50 milligrams of 8000 milligrams, preferably about 300 milligrams to 4000 milligrams may be provided in systemic administration to man, e.g., orally or parenterally. The compounds may be administered systemically to animals other than man in daily dosages up to about 400 milligrams per kilogram of body weight. Lesser quantities of the compounds may be administered at the situs of the condition under treatment, as low as 1 milligram, administering the compounds topically, interarticularly, and the like. The foregoing and other dosage levels herein are based on the content of tetrazole base. The compounds have long-lasting effects, lasting as long as 24 hours or more, a low order of toxicity, and relatively few observed side effects.

In the preferred embodiments of the invention, a 1-substituted-phenyl-5-aminotetrazole or a salt thereof is administered in a pharmaceutical composition which includes the tetrazole compound and a pharmaceutical carrier. The carrier is a non-toxic pharmaceutical grade substance, which may be either solid or liquid. Suitable solid carriers include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, dimethylsulfoxide, peanut oil, olive oil, sesame oil, alcohols, water, and the like. If desired, the carrier may include a time delay material such as glycerol monostearate, or glycerol distearate, alone or with a wax.

The composition preferably is provided in unit dosage form for accuracy and convenience in administration. Where appropriate, oral administration is effective and preferred, and dosage units suitable for oral administration are provided. Examples of such dosage units employing solid carriers include tablets, filled capsules, packets and the like, and lozenges. The amount of solid carrier per dosage unit may vary widely, preferably from about 25 milligrams to 1 gram.

The tetrazoles and their salts may be compounded with semi-solid and liquid carriers in solutions, suspensions, emulsions, ointments, suppositories and soft gelatin capsules, for example. Such compositions may be administered pancavally, i.e., via natural and artificial openings in the body, such as the mouth, the anus, the vagina, the nares, and the stoma of colostomy patients, intraveously, intramuscularly, or topically, employing the appropriate composition having a suitable concentration of active ingredient according to the desired route of administration.

The foregoing dosage forms are prepared by conventional procedures of mixing, granulating, compressing, suspending, and/or dissolving, as suitable for the desired dosage form.

An inflammatory condition of the animal organism is treated in accordance with the invention by administering a 1-substituted-phenyl-5-aminotetrazole of the invention or a pharmaceutically acceptable salt thereof in an amount sufficient to alleviate the symptoms of the condition. The compound preferably is administered at a dosage level as described above, and preferably in a pharmaceutical carrier. The dosage level and frequency are to a certain extent subjective, taking into consideration the cause of the inflammation, the case history, the reaction of the subject, and the like. The daily dosage may be administered in one or more parts during the day. Administration may be made pancavally, intramuscularly, intravenously, or topically. Administration preferably is oral in the treatment of diseases such as the rheumatoid diseases, most conveniently by means of tablets containing one of the active compounds and a pharmaceutical carrier.

Of the 1 - substituted-phenyl - 5 - aminotetrazole compounds which may be employed for treating inflammatory conditions in accordance herewith, the 1-(monohalophenyl)-5-aminotetrazoles is preferred, including the meta-chlorophenyl, meta-bromophenyl and meta-fluorophenyl, their derivatives and pharmaceutically acceptable salts.

Good results were obtained in anti-inflammatory bioassays using 1-(p-methoxyphenyl)-5-aminotetrazole,
1-(m-methoxyphenyl)-5-aminotetrazole,
1-(o-methylphenyl)-5-aminotetrazole,
1-(m-methylphenyl)-5-aminotetrazole,
1-(o-chlorobenzyl)-5-aminotetrazole,
1-(p-chlorobenzyl)-5-aminotetrazole, and
1-phenethyl-5-aminotetrazole.

The 1-(substituted)-phenyl-5-aminotetrazoles may be administered to subjects having abnormal muscle tone and tension, to produce muscle relaxation in ways similar to the administration used for anti-inflammatory benefits. A sufficient amount of the compound is administered to produce the desired relaxation, preferably in the dosage ranges set forth above. The active compound preferably is administered together with a pharmaceutical carrier. The compound is administered internally, preferably orally or parenterally, it being further preferred to employ oral administration in tablets. Administration may take place in equal doses one or more times daily, to provide the desired daily dosage.

We have obtained especially good results when administering to the animal organism the following 1-substituted-phenyl-5-aminotetrazoles to obtain muscle relaxation therein. The tetrazoles so used are:

1-(m-methylphenyl)-5-aminotetrazole,
1-(p-methylpenyl)-5-aminotetrazole,
1-(o-methylphenyl)-5-aminotetrazole,
1-(O-chlorophenyl)-5-aminotetrazole,
1-(m-chlorophenyl)-5-aminotetrazole,
1-(p-chlorophenyl)-5-aminotetrazole,
1-(o-bromophenyl)-5-aminotetrazole,
1-(m-bromophenyl)-5-aminotetrazole,
1-(p-bromophenyl)-5-aminotetrazole,
1-(o-fluorophenyl)-5-aminotetrazole,
1-(m-fluorophenyl)-5-aminotetrazole,
1-(p-fluorophenyl)-5-aminotetrazole,
1-(o-methoxyphenyl)-5-aminotetrazole,
1-(p-methoxyphenyl)-5-aminotetrazole,
1-(p-methylbenzyl)-5-aminotetrazole, and
1-(p-methoxyphenyl)-5-aminotetrazole.

The onset of activity in the animal organism is rapid, results being observed within one half hour, and the activity is sustained. Thus, the activity levels remain high for two or more hours, and activity persists over a 24 hour period. The long lasting activity is of particular significance, inasmuch as prior muscle relaxants lacked the desired duration of activity.

EXAMPLE I

The preparation of a 1-substituted-phenyl-5-aminotetrazole is illustrated by the preparation of 1-(m-bromophenyl)-5-aminotetrazole.

A mixture of 25.0 g. (0.11 mole) of m-bromophenyl thiourea, 15.6 g. (0.11 mole) of methyliodide and 250 ml. of ethanol was refluxed with stirring for 1 hour. The solvent was removed by vacuum distillation, and the crystalline solid which formed from the residue upon standing was triturated with 100 ml. of anhydrous ether, collected by filtration and dried to yield 39.5 g. of m-bromophenyl-S-methylisothiourea hydriodide, M.P. 138–40° C.

To a suspension of 35.8 g. (0.96 mole) of m-bromophenyl-S-methylisothiourea hydriodide in 200 ml. of ethanol was added 2.5 g. of 95% hydrazine. The mixture was refluxed with stirring for 1 hour and distilled under vacuum. The resulting 1-(m-bromophenyl)-5-aminoguanidine hydriodide which was obtained as an oil was used directly in the next step.

All of the preceding material was mixed with 200 ml. of hot water and a solution of 16.92 (0.1 mole) of silver nitrate, 50 ml. of water and 1.8 ml. of concentrated nitric acid was added. After vigorous stirring, 5 ml. of concentrated hydrochloric acid was added. After standing about 15 minutes, the silver halides were removed by filtration in a Buchner funnel and washed with 50 ml. of hot water. The filtrates were combined, and an additional 5 ml. of concentrated hydrochloric acid was added. The solution was stirred and cooled in an ice-bath to 10° C. and a solution of 8.3 g. (0.12 mole) of sodium nitrite in 20 ml. of water was added dropwise at a rate to maintain the reaction temperature below 10° C. Stirring was continued for 30 minutes, and the pH was adjusted to 8 with concentrated ammonium hydroxide. The mixture was heated briefly to 50° C. and cooled once more in an ice-bath. The precipitated solids were collected by filtration in a Buchner funnel, washed with cold water and dried to yield 12.5 g. (48% of theory) of 1-(m-bromophenyl)-5-aminotetrazole, M.P. 179–80° C., with decomposition (dec.). A sample for analysis was recrystallized from ethanol, M.P. 185–6° C., dec.

*Analysis.*—Calculated for $C_7H_6BrN_5$ (percent): C, 35.01; H, 2.52; N, 29.18. Found (percent): C, 35.31; H, 2.60; N, 29.31.

The following 1-(substituted)-phenyl-5-aminotetrazoles are prepared in the like manner, and they have the indicated melting point (M.P.):

| Derivatives: | Melting point, ° C. with dec. |
|---|---|
| o-Chlorophenyl | 225–6 |
| m-Chlorophenyl | 174–5 |
| p-Chlorophenyl | 222–3 |
| o-Fluorophenyl | 174–5 |
| m-Fluorophenyl | 170–1 |
| p-Fluorophenyl | 195–6 |
| o-Bromophenyl | 224–5 |
| p-Bromophenyl | 242–3 |
| o-Methylphenyl | 196–7 |
| m-Methylphenyl | 164–5 |
| p-Methylphenyl | 191–2 |
| o-Methoxyphenyl | 170–1 |
| m-Methoxyphenyl | 135–7 |
| p-Methoxyphenyl | 209–10 |

EXAMPLE 2

The preparation of 1-(substituted)-phenyl-5-aminotetrazole is illustrated by the preparation of 1-(m-fluorophenyl)-5-aminotetrazole, as follows:

To a stirred suspension of 22.8 g. (0.35 mole) of sodium azide in a solution of 12.1 g. (0.1 mole) of m-fluorobenzonitrile in 200 ml. of chloroform was added dropwise, 50 ml. of concentrated sulfuric acid. The acid was added by means of a dropping funnel with the tip extending below the surface of the liquid.

Stirring was continued overnight, and the solvent was removed by decanting. Approximately 100 g. of ice was added to the residue, and concentrated ammonium hydroxide was added to adjust the pH to 8.

The mixture was cooled in an ice-bath and the precipitated solids were collected by filtration in a Buchner funnel, washed with water and ether and dried to yield 7.1 g. (40% of theory) of 1-(m-fluorophenyl)-5-aminotetrazole, M.P. 165–8° C., dec. A sample for analysis was recrystallized from 1-propanol, M.P. 167–9° C., dec.

*Analysis.*—Calculated for $C_7H_6FN_5$ (percent): C, 46.90; H, 3.38; N, 39.08. Found (percent): C, 47.13; H, 3.52; N, 39.25.

The following 1-(substituted)-phenyl-5-aminotetrazoles were prepared in like manner, and they have the following melting points.

| Derivatives: | Melting point, ° C. with dec. |
|---|---|
| m-Methylphenyl | 164–5 |
| p-Methylphenyl | 191–2 |
| p-Fluorophenyl | 195–6 |
| p-Chlorophenyl | 222–3 |

EXAMPLE 3

The preparation of 1-(substituted)-phenyl-5-aminotetrazole is illustrated by the preparation of 1-(p-chlorobenzyl)-5-aminotetrazole.

A mixture of 20.0 g. (0.1 mole) of S-ethylisothiosemicarbazide hydrobromide, 14.2 g. (0.1 mole) of p-chlorobenzylamine and 100 ml. of ethanol was refluxed with stirring for 30 minutes. The solvent was removed by distillation under vacuum, and the residue was dissolved in a mixture of 100 ml. of water and 10 ml. of concentrated hydrochloric acid.

The solution was cooled to 10° C. by stirring in an ice-bath, and a solution of 6.9 g. (0.1 mole) of sodium nitrite in 15 ml. of water was added dropwise at a rate to maintain the temperature below 15° C. Stirring was continued for an additional 15 minutes, and the pH was adjusted to 8 by the addition of concentrated ammonium hydroxide.

The precipitate was collected in a Buchner funnel, washed with cold water and ether and dried to yield 11.4 g. of crude product. Two recrystallizations from 1-propanol yielded 5.7 g. (27% of theory) of 1-(p-chlorobenzyl)-5-aminotetrazole, M.P. 198.5–200° C., dec.

*Analysis.*—Calculated for $C_8H_8ClN_5$ (percent): C, 45.84; H, 3.85; N, 33.41. Found (percent): C, 45.75; H, 3.70; N, 33.57.

The following 1-(substituted)-phenyl-5-aminotetrazoles are prepared in like manner, and they have the indicated melting points.

| Derivatives: | Melting point, ° C. with dec. |
|---|---|
| Benzyl | 190–1 |
| o-Chlorobenzyl | 145–7 |
| m-Chlorobenzyl | 181–4 |
| p-Chlorobenzyl | 197–9 |
| p-Methoxybenzyl | 185–7 |
| p-Methylbenzyl | 196–8 |
| p-Isopropylbenzyl | 195–7 |
| Phenethyl | 175–7 |

EXAMPLE 4

The following are examples of several types of pharmaceutical compositions according to the invention:

Composition A

Tablets suitable for oral administration and having the following composition per tablet are produced by compounding the ingredients in the same relative proportions.

| Ingredients: | Amount, mg. |
|---|---|
| 1-substituted-phenyl-5-aminotetrazole | 200 |
| Sorbitol | 15 |
| Mannitol | 85 |
| Gelatin, as a 10% aqueous solution | 6 |
| Cornstarch | 30 |
| Magnesium stearate | 4 |

The first three ingredients are milled together to a uniform powder and granulated into the gelatin solution. The mixture is screened onto trays and dried at 60° C. The dried granules are sized, mixed with the cornstarch and the magnesium stearate, and compressed into tablets.

Composition B

Tablets suitable for oral administration and having the following composition per tablet are produced by compounding the ingredients in the same relative proportions.

| Ingredients: | Amount, mg. |
|---|---|
| 1-substituted-phenyl-5-aminotetrazole | 200 |
| Microcrystalline cellulose [1] | 150 |
| Polyvinyl pyrrolidone | 5 |
| Magnesium stearate | 4 |

[1] Avicel (FMC Corporation, U.S. Pat. No. 2,978,446), average particle size 38 microns.

The first three ingredients are mixed to uniformity and lubricated with a portion of the magnesium stearate. The mixture is compressed into slugs, and the slugs are reduced to uniformity and granulated. The granules are lubricated with the remainder of the magnesium stearate and compressed into tablets.

Composition C

Filled gelatin capsules suitable for oral administration and containing the following composition in each capsule are produced by compounding the ingredients in the same relative proportions:

| Ingredients: | Amount, mg. |
|---|---|
| 1-substituted-phenyl-5-aminotetrazole | 200 |
| Lactose | 175 |
| Magnesium stearate | 5 |

The above ingredients are screened through a #40 U.S. mesh screen to a uniform powder, transferred to a mixer, mixed well, and filled into #1 hard gelatin capsules.

Composition D

Filled soft gelatin capsules suitable for oral administration and containing the following composition in each capsule are produced by compounding the ingredients in the same relative proportions:

| Ingredients: | Amount, mg. |
|---|---|
| 1-substituted-phenyl-5-aminotetrazole | 50 |
| Sesame oil | 50 |

The ingredients are mixed to form a thick slurry, and the slurry is filled into soft gelatin capsules.

Composition E

Filled soft gelatin capsules suitable for oral administration and containing the following composition in each capsule are produced by compounding the ingredients in the same relative proportions:

| Ingredients: | Amount, mg. |
|---|---|
| 1-substituted-phenyl-5-aminotetrazole | 300 |
| Polyethylene glycol 400 | 240 |

The ingredients are mixed to form a thick slurry, and the slurry is filled into soft gelatin capsules.

Composition F

The following ingredients are compounded to provide a solution suitable for intramuscular administration:

| Ingredients: | Amount |
|---|---|
| 1-substituted-phenyl - 5 - aminotetrazole g | 200 |
| Polyethylene glycol 200, q.s. up to 1 liter. | |

The ingredients are mixed and warmed to about 50–60° about C. with stirring to effect solution. The solution is sterile filtered, cooled to room temperature, and packaged in sterile vials.

Composition G

Suppositories melting at about 60° F. and each having the following composition are produced by compounding the ingredients in the same relative proportions:

| Ingredients: | Amount, mg. |
|---|---|
| 1-substituted-phenyl-5-aminotetrazole | 200 |
| Polyethylene glycol 600 | 200 |
| Polyethylene glycol 4000 | 800 |

The ingredients are mixed and heated to about 60° C. to effect solution. The solution is poured into cooled molds and allowed to cool and thereby solidify.

Composition H

An ointment suitable for topical administration has the following composition, in parts by weight:

| Ingredients: | Parts |
|---|---|
| 1-substituted-phenyl-5-aminotetrazole | 200 |
| Polyethylene glycol 1540 | 500 |
| Polyethylene glycol 4000 | 80 |
| Propylene glycol | 200 |
| Cetyl alcohol | 20 |

The polyethylene glycols and the cetyl alcohol are mixed and warmed to about 60° C. The tetrazole then is stirred into the mixture to effect solution. The propylene glycol is added to the solution with stirring until cool. The cool ointment is filled into jars.

Composition I

Tablets used for oral administration of 1-methyl-phenyl-5-aminotetrazole as described hereinafter and having the following composition per tablet are produced by compounding the ingredients in the same relative proportions:

| Ingredients: | Amount, mg. |
|---|---|
| 1-methylphenyl-5-aminotetrazole | 200 |
| Dicalcium phosphate | 180 |
| Cornstarch | 60 |
| Polyvinylpyrrolidone | 5 |
| Magnesium stearate | 4 |

The tetrazole, dicalcium phosphate and a portion of the starch and magnesium stearate are mixed, granulated with an alcoholic solution of the polyvinylpyrrolidone, dried, and sized. The remained of the starch and the magnesium stearate are added and mixed. This mixture then is compressed into tablets.

Composition J

Tablets used for oral administration of 1-methyl-phenyl-5-aminotetrazole as described hereinafter and having the following composition per tablet are produced by compounding the ingredients in the same relative proportions:

| Ingredients: | Amount, mg. |
|---|---|
| 1-methylphenyl-5-aminotetrazole | 200 |
| Lactose | 200 |
| Microcrystalline cellulose | 30 |
| Polyvinylpyrrolidone | 5 |
| Amberlite XE–88 [1] | 5 |
| Magnesium stearate | 4 |

[1] Potassium salt of a carboxylic acid cation exchange resin.

EXAMPLE 5

Each of the compound listed in Table I was subjected to an anti-inflammatory pharmacological assay using a modification of the Selye Granuloma Pouch assay [Arch. int. Pharmacodyn. 97, 379 (1954)], the modification being that *Mycobacterium butyricum* (adjuvant) was used as the phlogistic agent in place of croton oil. Male rats obtained from Holtzman Company, Madison, Wis. and weighing 200 to 240 grams each, were used throughout the assay. The dorsal area of each animal was shaved with an electric clipper and the animals were placed under light ether anesthesia. The shaved regions were wiped with 70% ethanol, and 25 ml. of air was injected at the approximate center of each animal's shaved portion using a syringe and 24 gauge needle.

The phlogistic agent (a killed and dried preparation of *Mycobacterium butyricum* was suspended to provide 0.125 mg. of agent in 0.5 ml. sesame oil. This suspension was then injected using a 22 gauge needle into the formed air pouch at a situs different from that of the air injection. All syringe needles were immersed in 70% ethanol between uses in successive animals. To insure accurate dosage, the phlogistic-agent suspension was continuously mixed with a magnetic stirrer. In all instances, air was removed 48 hours after formation of the pouch. The test compounds were triturated in a mortar and pestle with 1% pectin, and the resulting suspension was administered by gavage in a volume of 1/ml./100 g. body weight. All test animals were administered test compounds once per day for 4 consecutive days, beginning on the day of pouch formation. The animals were necropsied on the 5th day.

The volume of exudate formed in each animal treated by the drug is then compared with the volume of exudate formed in the untreated control animals. A reduced volume of exudate is an accepted measure of anti-inflammatory activity. The relationship of the difference between the volume of exudate in the test animal and that of the control animal compared to the value of the control animal is reported below as "percent inhibition." The higher this value, the more effective a test compound is as an anti-inflammatory drug.

The results obtained for the compounds in the foregoing assay are reported in Table I.

TABLE I.—ANTI-INFLAMMATORY ACTIVITIES OF 1-SUBSTITUTED-PHENYL-5-AMINOTETRAZOLES

| Substituent | Granuloma dose, mg./kg. | Pouch assay, percet inhibitinon | Cotton pelle assay, reductiot in granulationn mg |
|---|---|---|---|
| o-Chlorophenyl | 200 | 36 | 0.1 |
| m-Chlorophenyl | 200 | 94 | 2.4 |
| p-Chlorophenyl | 200 | 60 | 0.8 |
| o-Fluorophenyl | 200 | 32 | 0.9 |
| m-Fluorophenyl | 50 | 48 | 0.7 |
| p-Fluorophenyl | 200 | 54 | −0.2 |
| m-Bromophenyl | 200 | 50 | 1.3 |
| p-Bromophenyl | 100 | 12 | 1.3 |
| o-Methylphenyl | 200 | 94 | 0.1 |
| m-Methylphenyl | 100 | 34 | −0.1 |
| m-Methoxyphenyl | 200 | 92 | −0.1 |
| p-Methoxyphenyl | 200 | 44 | ---------- |
| Benzyl | 200 | 58 | −0.5 |
| o-Chlorobenzyl | 200 | 32 | 3.3 |
| p-Chlorobenzyl | 200 | 69 | 0.2 |
| p-Methoxybenzyl | 200 | 10 | 1.6 |
| p-Isopropylbenzyl | 200 | 10 | 2.4 |
| Phenethyl | 200 | 42 | −0.2 |

The results summarized in Table I indicate that each of the compounds possess anti-inflammatory activity in at least one of these anti-inflammatory assays and in some cases in both assays. The activity desired is at least about 30% inhibition in the granuloma pouch assay or at least about 1 mg. reduction in granulation in the cotton pellet assay.

EXAMPLE 6

Central nervous system depressant activities were determined for 1-substituted-phenyl-5-aminotetrazoles, by a mouse battery assay. Mice were tested in groups of five, employing three treated groups and one untreated control group for each test. The average response to each tetrazole was determined at 200 mg./kg. The tetrazoles were administered orally in 1% aqueous pectin, administering 2 ml. 100 grams of body weight to each animal. Separate assays were run 30, 60 and 120 minutes after drug administration, and the results are reported in Table II which follows, as the average response for all three time periods. The table shows the average fall of body temperature, hind limb extensor tonus block, and increase in Metrazol threshold.

TABLE II.—CENTRAL NERVOUS SYSTEM DEPRESSANT ACTIVITIES OF 1-SUBSTITUTED-PHENYL-5-AMINOTETRAZOLES

| Substituent | Body temp. fall, ° F. | H.L. extensor tonus block, percent of animals | Metrazol threshold increase, percent |
|---|---|---|---|
| o-Chlorophenyl | 3.3 | 100 | 26 |
| m-Chlorophenyl | 2.2 | 100 | 107 |
| p-Chlorophenyl | 5.1 | 80 | 83 |
| o-Fluorophenyl | 4.3 | 100 | 11 |
| m-Fluorophenyl | 4.2 | 100 | 71 |
| p-Fluorophenyl | 6.8 | 87 | 49 |
| o-Bromophenyl | 3.4 | 100 | 13 |
| m-Bromophenyl | 2.2 | 100 | 62 |
| p-Bromophenyl | 2.9 | 73 | 35 |
| o-Methylphenyl | 7.4 | 100 | 33 |
| m-Methylphenyl | 7.3 | 100 | 55 |
| p-Methylphenyl | 7.4 | 60 | 102 |
| o-Methoxyphenyl | 3.8 | 80 | 0 |
| p-Methoxyphenyl | 0.5 | 40 | 74 |
| Benzyl | 6.3 | 100 | −2 |
| o-Chlorobenzyl | 4.7 | 100 | 47 |
| m-Chlorobenzyl | 4.4 | 100 | 10 |
| p-Chlorobenzyl | 7.8 | 100 | 109 |
| p-Methylbenzyl | 1.4 | 67 | 49 |
| p-Methoxybenzyl | 5.1 | 33 | −5 |
| Phenethyl | 7.3 | 33 | 87 |

The compounds all exhibited muscle relaxant activity, indicated by extensor tonus block and body temperature fall. The activities of the compounds did not decrease over the period from ½ hour after administration to 2 hours after administration, indicating that the compounds were long-acting. It is preferred that the elevation of Metrazol threshold be not more than about 100%, more preferably not more than 50%, for use as a muscle relaxant. An increase in the Metrazol threshold of greater than 100% indicactes that the compound has sedative-hypnotic properties.

In toxicity studies with 1-(substituted)-phenyl-5-aminotetrazoles, administration at relatively high doses to mice and rats produced a low order of toxicity. Tests for determining the acute oral toxicity in mice produced no deaths at 200 mg./kg. for all of these compounds. Doses as high as 1000 mg./kg. of 1-(o-methylphenyl)-5-aminotetrazoles produced 0/8 dead. In rats, four consecutive daily doses of 100–200 mg./day under the conditions of the granuloma pouch assays produced no deaths with any of these compounds. These results demonstrated relatively low toxicity for the 1-substituted-phenyl-5-aminotetrazoles.

From the foregoing, it becomes apparent that the invention herein described and illustrated fulfills all of our objectives, expressed and implied, in a remarkably unexpected fashion and that we have developed new and useful compounds, pharmaceutical compositions and therapeutic methods for providing muscle relaxation and alleviating inflammatory conditions.

While certain preferred embodiments of the invention have been described, it will be apparent to those skilled in the art that various changes and modifications may be made within the spirit and scope of the invention. It is intended that such changes and modifications be included within the scope of the appended claims.

What is claimed is:

1. A pharmaceutical composition used to relieve inflammatory conditions and muscle tension in the form of a tablet, capsule, packet, lozenge, solution, suspension, ointment, emulsion or suppository comprising as its active ingredient an effective amount of a compound selected from the group consisting of 1-(substituted)-phenyl-5-aminotetrazoles and pharmaceutically acceptable salts thereof, and a pharmaceutical carrier, said substituted moiety being selected from the group consisting of substituted phenyl, said substituted phenyl being monohalophenyl, monohydroxphenyl, monoalkylphenyl or monoalkoxyphenyl.

2. A composition according to claim 1 in which alkoxyphenyl moiety is monomethoxyphenyl.

3. A composition according to claim 1 in which said halophenyl is monobromophenyl or monofluorophenyl.

4. A composition according to claim 1 in which said monoalkylphenyl is methylphenyl.

5. A method of treating an animal suffering from an inflammatory condition comprising administering to said animal suffering from said condition the active ingredient according to claim 1 in an amount sufficient to alleviate the symptoms of the condition.

6. A method as defined in claim 5 wherein the substituted phenyl is a halophenyl selected from the group consisting of monochlorophenyl, monobromophenyl and monofluorophenyl.

7. A method as defined in claim 6 wherein said halophenyl is meta-monohalophenyl.

References Cited

UNITED STATES PATENTS 3,278,381 10/1966 Bossinger et al. ------ 424—269

STANLEY J. FRIEDMAN, Primary Examiner